(12) United States Patent
Nhiayi

(10) Patent No.: US 9,288,524 B2
(45) Date of Patent: Mar. 15, 2016

(54) USING TV OVER VPN TO PRESENT REMOTE DEVICE APPLICATION GRAPHICS

(75) Inventor: Ly-Kao Nhiayi, San Diego, CA (US)

(73) Assignee: Sony Corporation, Tokyo (JP)

( * ) Notice: Subject to any disclaimer, the term of this patent is extended or adjusted under 35 U.S.C. 154(b) by 824 days.

(21) Appl. No.: 13/332,980

(22) Filed: Dec. 21, 2011

(65) Prior Publication Data

US 2013/0167179 A1    Jun. 27, 2013

(51) Int. Cl.
| | | |
|---|---|---|
| H04N 21/41 | (2011.01) | |
| H04N 21/422 | (2011.01) | |
| H04N 21/431 | (2011.01) | |
| H04N 21/4367 | (2011.01) | |
| H04N 21/443 | (2011.01) | |
| H04N 21/643 | (2011.01) | |

(52) U.S. Cl.
CPC ....... *H04N 21/4126* (2013.01); *H04N 21/4222* (2013.01); *H04N 21/4367* (2013.01); *H04N 21/443* (2013.01); *H04N 21/64322* (2013.01)

(58) Field of Classification Search
CPC ................... H04N 21/4126; H04N 21/42207; H04N 21/4312
USPC ....................... 725/80–81; 348/565
See application file for complete search history.

(56) References Cited

U.S. PATENT DOCUMENTS

| | | | |
|---|---|---|---|
| 7,652,722 B2 | 1/2010 | Kim | |
| 7,831,992 B2 | 11/2010 | Stone | |
| 2001/0050914 A1* | 12/2001 | Akahane et al. | 370/382 |
| 2004/0055018 A1* | 3/2004 | Stone | 725/113 |
| 2005/0225685 A1* | 10/2005 | Kim | 348/838 |
| 2007/0198656 A1 | 8/2007 | Mazzaferri et al. | |
| 2011/0242268 A1 | 10/2011 | Kim et al. | |
| 2011/0258049 A1 | 10/2011 | Ramer et al. | |
| 2011/0277001 A1* | 11/2011 | Kaluskar et al. | 725/80 |
| 2011/0283334 A1* | 11/2011 | Choi et al. | 725/148 |

FOREIGN PATENT DOCUMENTS

| | | |
|---|---|---|
| JP | H10290488 A | 10/1998 |
| JP | 2007150958 A | 6/2007 |
| JP | 2010108372 | 5/2010 |
| JP | 2011239277 A | 11/2011 |
| WO | 2010062617 | 6/2010 |
| WO | 2011094734 A2 | 8/2011 |

OTHER PUBLICATIONS

Debra Littlejohn Shinder, "Securley connect your Andriod smartphone via VPN", Aug. 15, 2011 http://www.techrepublic.com/blog/smartphones/securely-connect-your-andriod-smartphone-via-vpn/3321.

* cited by examiner

*Primary Examiner* — Benjamin R Bruckart
*Assistant Examiner* — Aklil Tesfaye
(74) *Attorney, Agent, or Firm* — John L. Rogitz

(57) ABSTRACT

A wireless device such as an Android-based smart phone or tablet computer can establish a VPN connection with an Android-based TV to cause the TV to run an application and provide graphics from the wireless device and be controlled from the wireless device.

7 Claims, 4 Drawing Sheets

Establishing VPN Between TV & Device

Overall Control Logic

Remote Device Screen Shot

TV Screen Rotation

Remote Device Screen Shot

USING TV OVER VPN TO PRESENT REMOTE DEVICE APPLICATION GRAPHICS

I. FIELD OF THE INVENTION

The present application relates generally to using a TV over a virtual provate network (VPN) to present graphics from an application in a remote device while the remote device controls the TV.

II. BACKGROUND OF THE INVENTION

Devices such a smart phones, tablet computers, and the like can now run a host of applications for the user's benefit. These applications typically include graphic displays or at the least graphical user interfaces (UI) that can be used to control the applications. As understood herein, with the advent of televisions that use computer operating systems which are also used by smart phones, tablet computers, etc., the opportunity arises to leverage this use by using the TVs as larger, more robust displays for nearby remote devices.

SUMMARY OF THE INVENTION

Accordingly, a system includes a TV that in turn includes a TV display, a TV processor controlling the display, and a TV communication interface (TVCI) through which the TV processor can communicate. The TV also has a TV computer readable storage medium (TVCRSM) accessible to the TV processor and bearing an operating system (OS) executable by the TV processor.

The system also includes a wireless device with a wireless device (WD) processor, a wireless device communication interface (WDCI) through which the WD processor can communicate with the TV processor via the TVCI, and a WD computer readable storage medium (WDCRSM) accessible to the WD processor and bearing an operating system (OS) executable by the WD processor. The WD and TV communicate through a virtual private network (VPN) link to cause an application to be executed by the TV processor for presentation of images demanded by the application on the TV display according to control signals received from the WD through the VPN link.

In some embodiments, the OS executed by the WD processor and the TV processor is an Android OS. The WD may communicate with the TV through the VPN by encapsulating packets having a first protocol in a datagram of a second protocol. The WD can be, e.g., a smart phone or tablet computer.

As set forth further below, in example implementations the WD processor controls WD display and the TV sends video information to the WD for presentation on the WD display according to the application. The WD can send the application to the TV for execution thereof by the TV processor according to user commands input to the WD. If desired, a video presentation on the TV is rotated relative to a normal video presentation according to a demanded image from the application.

In another aspect, a wireless device establishes a virtual private network (VPN) connection with a TV to cause the TV to run an application and provide graphics from the wireless device and be controlled from the wireless device.

In still another aspect, a TV system includes a TV display, a TV processor controlling the display, and a TV communication interface (TVCI) through which the TV processor can communicate. A TV computer readable storage medium (TVCRSM) accessible to the TV processor bears an operating system (OS) executable by the TV processor to cause an application to be executed by the TV processor for presentation of images demanded by the application on the TV display according to control signals received from a wireless device (WD) through a virtual private network (VPN) link.

The details of the present invention, both as to its structure and operation, can be best understood in reference to the accompanying drawings, in which like reference numerals refer to like parts, and in which:

DETAILED DESCRIPTION OF THE PREFERRED EMBODIMENT

Figure 1:
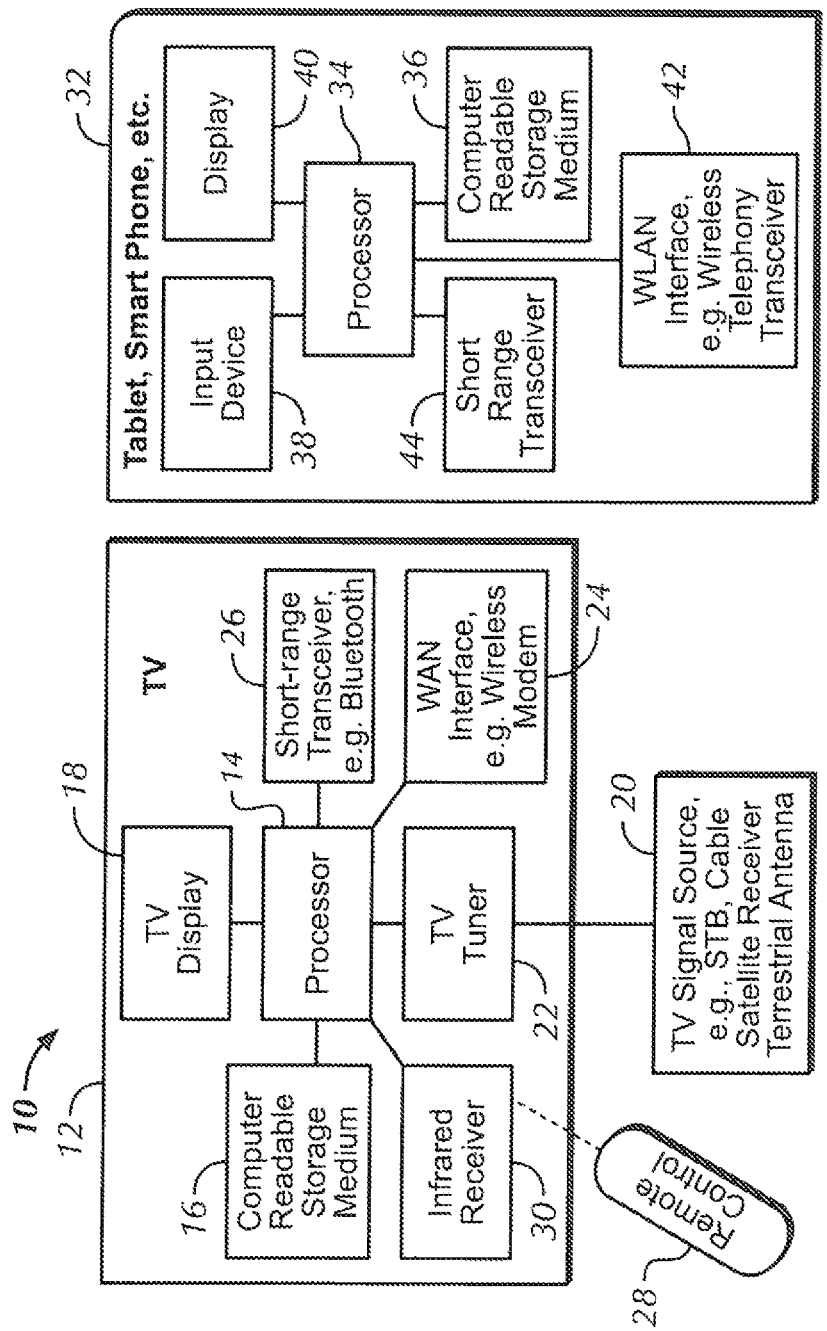
FIG. 1 is a block diagram of a non-limiting example system in accordance with present principles.

Referring initially to the non-limiting example embodiment shown in FIG. 1, a system 10 includes a TV 12 that has, among other components, a processor 14 accessing a computer readable storage medium 16 such as solid state memory. Disk memory may also be accessible to the processor 14. The processor 14 may execute a computer operating system such as an Android (trademark) O.S. stored on one of the memories 16 to execute various computer applications, games, etc. The processor 14 may also present on a display 18 TV programming received from a TV source 20, which may be received via a TV tuner 22. The display 18 can be, without limitation, a standard definition computer monitor, a touch screen display, a flat screen standard definition or high definition display, or other video display.

Additionally, the processor 14 may communicate with a wide area network such as the Internet through a wide area network interface 24, such as a wireless telephony transceiver, a wired or wireless modem, etc. Further, the processor 14 may communicate with a short range transceiver such as a Bluetooth transceiver. The processor 14 may receive channel, volume, and other TV-related commands from a remote controller 28 through a wireless receiver 30 such as an infrared receiver.

Using the WAN interface 24 and/or short-range transceiver 26, the tV 12 can communicate with a wireless device 32 using, e.g., a virtual private network (VPN) to execute applications, games, etc. that are typically associated with the wireless device 32. The wireless device 32 may be, e.g., a smart phone, tablet computer, game console, laptop or notebook or other computer, camera, etc. which can include a processor accessing a computer readable storage medium 36 to execute an operating system such as an Android O.S. The processor 34 may receive input from one or more input devices 38 such as mice or other point-and-click devices, keypads, keyboards, voice recognition software, etc. and output user interfaces, graphics, video, and the like on a display 40 such as a touch screen display. Also, the processor 14 may communicate with the TV 12 using a network interface 42 such as a wireless telephony interface, wireless modem, and the like and/or may also communicate with the TV 12 using a short range transceiver 44 such as a Bluetooth transceiver.

Figure 2:
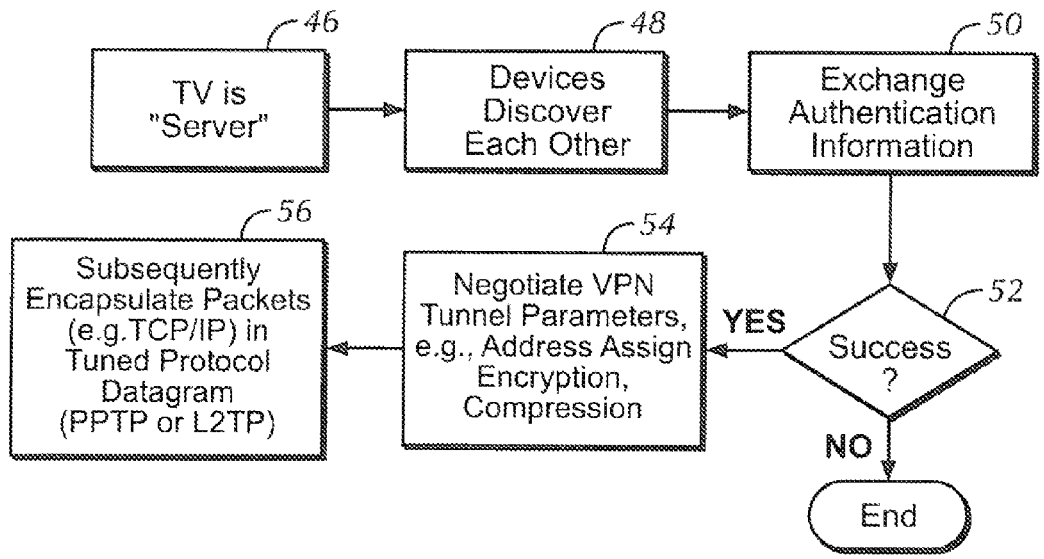
FIG. 2 is a flow chart of example VPN establishment logic.

Now referring to FIG. 2, a VPN may be established between the TV 12 and WD 32 if desired, particularly when both are based on the same OS, e.g., Android, which facilitates such VPN establishment. Commencing at block 46, with the TV 12 filling a VPN server role, the logic moves to block 48, wherein the TV 12 and WD 32 may discover each other automatically using discovery principles. The discovery may be undertaken using the two short range transceivers 26, 44. Or, a user may cause the two devices to connect to each other.

In some embodiments the logic may move to block 50 to exchange authentication information using, e.g., public key-private key principles known in the art. Authentication may include, for instance, verifying that the partner component is an authorized component from the same manufacturer. In any case, if authentication is successful at decision diamond 52, the logic flows to block 54 to negotiate VPN tunnel parameters if those parameters are not pre-programmed into the devices 12, 32. The tunnel parameters may include address assignments, encryption method, and compression mode in which data is to be sent. If authentication is not successful at decision diamond 52, the logic ends. Subsequently, as indicated at block 56 information is exchanged between the TV 12 and WD 32 in packets that are formatted using a first protocol, such as but not limited to transmission control protocol/Internet protocol (TCP/IP), and they encapsulated in datagrams of a second protocol, such as but not limited to point-to-point tunneling protocol (PPTP) or layer-2 tunneling protocol (L2TP).

Figure 3:
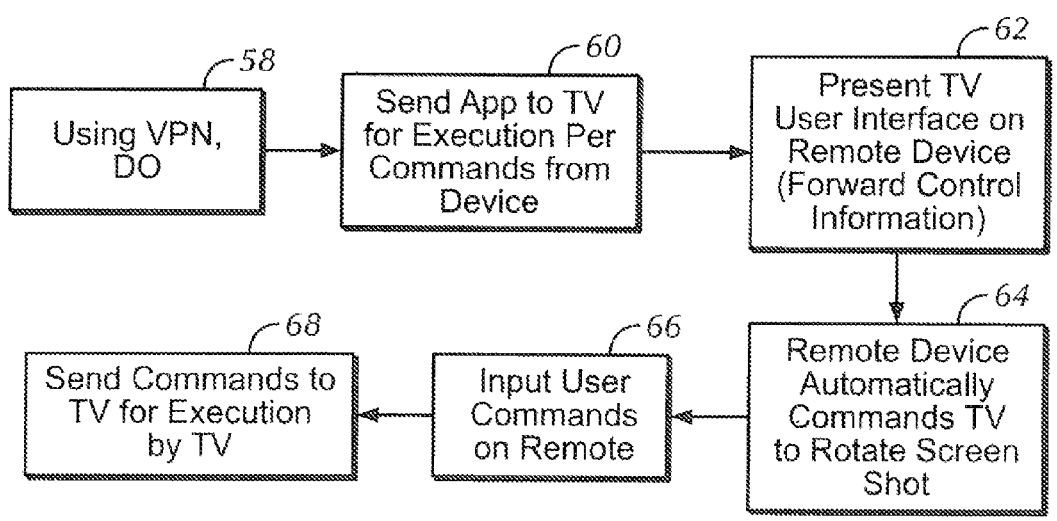
FIG. 3 is a flow chart of example control logic.

FIG. 3 illustrates overall general logic in accordance with present principles to allow a user to employ the WD 32 to control an application or game on the TV 12 that is ordinarily run on the WD. Commencing at block 58, the above-described VPN may be established between the TV 12 and WD 32, and then at block 60 an application or game may be sent from the WD 32 to the TV 12 for execution of the game or application by the TV processor 14 according to commands from the WD 32. In other embodiments the WD 32 may simply automatically download or synchronize all of its games and applications to the TV without user interaction on the recognition that the user typically owns both the TV 12 and IND 32 and may wish to avail himself of the larger, more capable TV display to control an application ordinarily executed on the WD 32. Yet again, the TV 12 may be provided with the games and applications at manufacturing time.

For example, among the games and applications that can be executed on the TV 12 may includes games as well as computer applications such as books and references, business applications, comics, communication applications, education applications, entertainment applications, finance applications, health and fitness applications, libraries and demonstration applications, lifestyle applications, live computer wallpaper applications, media and video applications, medical applications, music and audio applications, news and magazine applications, device personalization applications, photography applications, productivity applications, shopping applications, social network applications, sports applications, computer tools applications, transportation and map applications, travel and local applications, weather applications, and widgets.

Proceeding to block 62, with the TV 12 executing the game or application according to commands input to the WD 32 using the input device 38 and received by the TV, e.g., through the Bluetooth transceivers 26, 44, a user interface (UI) generated by the TV according to instructions from the application may be presented on the WD if desired. Control information, as stated above, may be sent from the WD to TV 12 according to user-input commands.

If desired, at block 64 the WD or application may command the TV 12 to automatically rotate its video presentation on the TV display 18 according to further discussion below. Block 66 simply indicates that the user inputs commands at the WD 32 which are sent at block 68 through the VPN to the TV 12 for execution of the commands by the TV processor 14 according to the game or application being executed by the TV.

Figure 4:
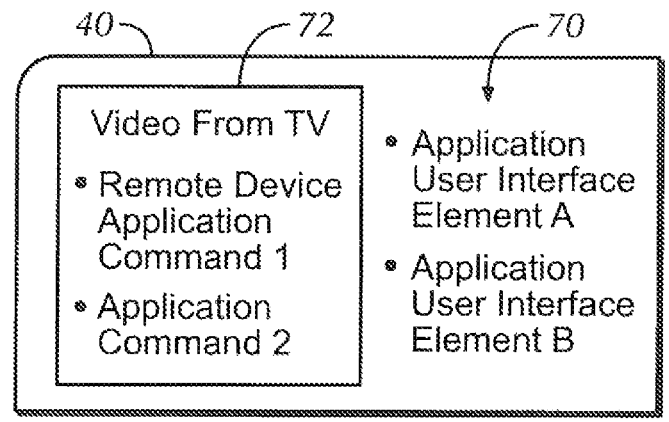
FIG. 4 is a screen shot of a remote device presentation.

FIG. 4 shows a screen shot 70 that may be presented on the WD 32 according to information received from the TV 12. As shown in a pane 72, video or other images from the TV may be presented on the WD display 40. The video or other images may contain UI elements as shown such as "command 1" and "command 2" to facilitate entry of the commands from the WD 32 when, for example, the display 40 is a touch screen display, and the user of the WD 32, were the WD 32 executing the application, would expect to operate the application using touch screen commands.

Figure 5:
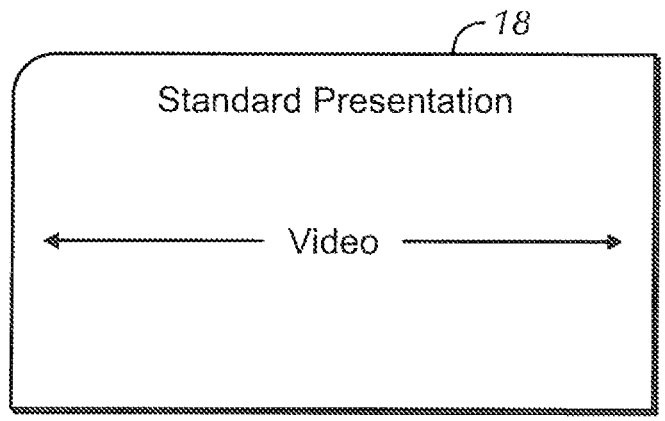
FIGS. 5 and 6 are TV screen shots showing how a TV application presentation may be rotated to mimic the presentation on the native remote device.
Figure 6:
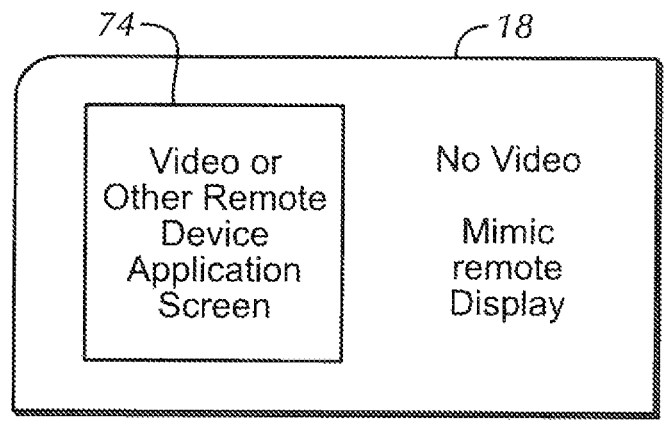

FIGS. 5 and 6 illustrate further principles of the presentation rotation mentioned above in reference to block 64 of FIG. 3, FIG. 5 shows that a video presentation of TV programming, i.e., TV video presentation, may be presented on the TV display 18 in for example, a 4×3 aspect ratio (AR) for standard definition (SD) TV video or 16×9 AR for high definition (HD) TV. But recognizing that some applications may be designed to present video with other orientations or aspect ratios in mind, the TV processor 14 may rotate the video presentation from the conventional orientation shown in FIG. 5 to the application's demanded orientation shown in FIG. 6. In FIG. 6, the application has demanded an AR that is longer than it is wide as shown, it being understood that FIG. 6 is for example only. As shown, a window 74 that is higher than it is wide relative to the TV display 18 is presented on the TV display 18, as demanded by the particular game or application being executed. No video is presented in the remainder of the TV display 18, to mimic how the application video would be presented on the WD display 40 were it to be executed entirely on the WD 32.

Figure 7:
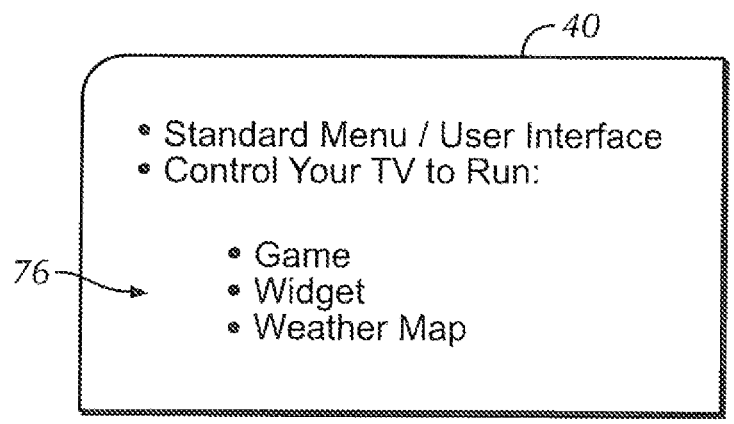
FIG. 7 is a screen shot of an example remote device setup UI.

FIG. 7 shows an example screen shot 76 that can be presented on the WD display 40 to enable a person to select between a standard WD menu/UT and a TV control function, in which the user may also select the name of the desired game or application (from a list, for instance) that the user desires to be executed and presented on the TV under control of user commands input to the WD 32.

While the particular USING TV OVER VPN TO PRESENT REMOTE DEVICE APPLICATION GRAPHICS is herein shown and described in detail, it is to be understood that the subject matter which is encompassed by the present invention is limited only by the claims.

What is claimed is:
1. System comprising:
TV, comprising:
  TV display;
  TV processor configured for controlling the display;
  TV communication interface (TVCI) through which the TV processor can communicate;
  TV computer readable storage medium (TVCRSM) accessible to the TV processor and bearing an operating system (OS) executable by the TV processor; and
a wireless device, comprising:
  wireless device (WD) processor;

wireless device communication interface (WDCI) through which the WD processor can communicate with the TV processor via the TVCI;

WD computer readable storage medium (WDCRSM) accessible to the WD processor and bearing at operating system (OS) executable by the WD processor, wherein the WD and TV are configured to communicate through a virtual private network (VPN) link to cause an application to be executed by the TV processor for presentation of images demanded by the application on the TV display according to control signals received from the WD through the VPN link, wherein the WD is configured to send the application to the TV for execution thereof by the TV processor according to user commands input to the WD.

2. The system of claim 1, wherein the OS executed by the WD processor and the TV processor is an Android OS.

3. The system of claim 1, wherein the WD is configured to communicate with the TV through the VPN at least in part by encapsulating packets having a first protocol in a datagram of a second protocol.

4. The system of claim 1, wherein the WD is a smart phone.

5. The system of claim 1, wherein the WD is a tablet computer.

6. The system of claim 1, wherein the WD processor is configured to control a WD display and the TV is configured to send video information to the WD for presentation on the WD display according to the application.

7. The system of claim 1, wherein the TV processor is configured to rotate a video presentation on the TV relative to a normal video presentation according to a demanded image from the application.

* * * * *